US008811354B2

(12) United States Patent
Bu et al.

(10) Patent No.: US 8,811,354 B2
(45) Date of Patent: Aug. 19, 2014

(54) METHODS AND DEVICES FOR ASSOCIATING USERS TO BASE STATIONS IN THIRD GENERATION WIRELESS NETWORKS USING FAIRNESS CONSIDERATIONS

(75) Inventors: Tian Bu, Edison, NJ (US); Li Li, Edison, NJ (US); Ramachandran Ramjee, Summit, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1120 days.

(21) Appl. No.: 11/635,678

(22) Filed: Dec. 8, 2006

(65) Prior Publication Data

US 2008/0137608 A1      Jun. 12, 2008

(51) Int. Cl.
*H04B 7/216* (2006.01)

(52) U.S. Cl.
USPC ........... 370/335; 455/436; 455/446; 455/438; 455/439

(58) Field of Classification Search
CPC ... H04W 84/042; H04W 88/08; H04W 88/12; H04W 88/14; H04W 28/18; H04W 72/1273
USPC .......... 455/436–442, 450–453; 370/328–334
See application file for complete search history.

(56) References Cited

U.S. PATENT DOCUMENTS

| 2005/0215265 A1* | 9/2005 | Sharma ........................ 455/453 |
| 2006/0002417 A1* | 1/2006 | Yucel ........................... 370/437 |
| 2006/0251011 A1* | 11/2006 | Ramakrishnan et al. ..... 370/328 |

OTHER PUBLICATIONS

TIA/EIAcdma2000, *Mobile Station—Base Station Compatibility Standard for Dual-Mode Wideband Spread Spectrum Cellular Systems*, Washington: Telecommunication Industry Association, 1999.
UMTS, Release 5, 3G Partnership Project, 2003.
Home page at http://www.cdg.org, CDMA Development group.
F. P. Kelly et al., *Charging and Rate Control for Elastic Traffic*, European Transactions on Telecommunications, vol. 8, pp. 33-37, 1997.
A. Sang et al., *Coordinated Load Balancing, Handoff/cell-site Selection, and Scheduling in Multi-cell Packet Data Systems*, In Proceedings of the 10th Annual International Conference on Mobile Computing and Networking, pp. 302-314, 2004.
S. Das et al., *Dynamic Load Balancing Through Coordinated Scheduling in Packet Data Systems*, In Proc. IEEE INFOCOM, 2003.
*1xEV: 1x EVolution IS-856 TIA/EIA Standard—Airlink Overview*, QUALCOMM Inc. White Paper, Nov. 2001.
S. Borst, *User-Level Performance of Channel-Aware Scheduling Algorithms in Wireless Data Networks*, In Proc. of INFOCOM, (San Francisco, CA), Apr. 2003.
J. K. Lenstra et al., *Approximation Algorithms for Scheduling Unrelated Parallel Machines*, Mathematical Programming, vol. 46, pp. 259-281, 1990.
V. Vazirani, *Approximation Algorithms*, Springer-Verlag New York, Incorporated, Jun. 1999.

(Continued)

*Primary Examiner* — Kathy Wang-Hurst
(74) *Attorney, Agent, or Firm* — Capitol Patent & Trademark Law Firm, PLLC (57) ABSTRACT

The transmission of data from base stations to users (and their devices) in a wireless network is made using proportional fairness without sacrificing throughput by taking in to account fairness considerations at the time the devices are associated with a base station.

18 Claims, 5 Drawing Sheets

(56) References Cited

OTHER PUBLICATIONS

P. Bender et al., *CDMA HDR: A Bandwidth-Efficient High-Speed Wireless Data Service for Nomadic Users*, IEEE Communications Magazine, vol. 38, pp. 70-77, Jul. 2000.
W.C. Jakes et al., *Microwave Mobile Communication*, Wiley, 1974.
Y. Bejerano et al., *Fairness and Load Balancing in Wireless LANs Using Association Control*, In Proc. of the $10^{th}$ Annual International Conference on Mobile Computing and Networking, pp. 315-329, 2004.
R. Jain et al., *A Quantitative Measure of Fairness and Discrimination for Resource Allocation in Shared Computer Systems*, DEC TR-301, Littleton, MA: Digital Equipment Corporation, 1984.
A. Jalali et al., *Data Throughput of CDMA HDA a High Efficiency-High Data Rate Personal Communication Wireless System*, In Proc. of IEEE Vehicular Technology Conference, May 2000.
P. Viswanath et al., *Opportunistic Beamforming Using Dumb Antennas*, IEEE Transactions on Information Theory, vol. 48, Jun. 2002.
M. Andrews et al., *Providing Quality of Service Over a Shared Wireless Link*, IEEE Communications Magazine, Feb. 2001.
S. Shakkottai et al., *Scheduling Algorithms for a Mixture of Real-time and Non-Real-Time Data in HDR*, In Proc. of ITC-17, pp. 793-804, Sep. 2001.
S. Shakkottai et al., *Scheduling for Multiple Flows Sharing a Time-Varying Channel: The Exponential rule*, Analytic Methods in Applied Probability, vol. 207, pp. 185-202, 2002.
A. Stolyar et al., *Largest Weighted Delay First Scheduling: Large Deviations and Optimality*, Annals of Applied Probability, vol. 11, No. 1, pp. 1-48, 2001.
K. Norlund et al., *Fairness Measures for Best Effort Traffic in Wireless Networks*, In Proc. of PIMRC, 2004.
C. Westphal, *Monitoring Proportional Fairness in cdma2000 High Data Rate Networks*, In Proc. of Globecom, 2004.
S, Keshav, *An Engineering Approach to Computer Networking*, In Addisson Wesley, 1997.

\* cited by examiner

Algorithm OfflineOPT-KBS
Input: Network $H=(A,U)$, multi-user diversity
gain $G(\ ), \tau_{ua}, \forall a \in, u \in U$
for each $(y_1, \ldots, y_{|A|})$ such that $\sum_{j=1}^{|A|} = n$
  if $y_i > |Q_i|$ where $Q_i = \{u | \tau_{ui} > 0, \forall u \in U\}$,
  then next iteration
  if $\tau_{ui} = 1$ and $y_i > 0$,
    $p_{ui} = \log (\tau_{ui} \frac{G(y_i)}{y_i})$
  else $p_{ui} = 0$
  MatchingAlgo$(H, \{p_{ui}\})$
end

FIG. 4

Algorithm KComponent
Input: Network $H=(A,U)$, multi-user diversity
gain $G(\ )$, mapping $(R)$ s.t. $R(u,a) = \tau_{ua}$, $\forall a \in u \in U$
Run MinK-Cut Algorithm to obtain
$H_1, \ldots, H_K$ connected components
for each $H_j, \forall j = 1, \ldots, K$
  OfflineOPT-KBS $(H_j, G, R)$
for each user $u$ whose edges cross components
  Greedily assign $u$ to BS $a$ that improves
  the objective function the most
end

METHODS AND DEVICES FOR ASSOCIATING USERS TO BASE STATIONS IN THIRD GENERATION WIRELESS NETWORKS USING FAIRNESS CONSIDERATIONS

BACKGROUND OF THE INVENTION

Third Generation, wide-area wireless data networks ("3G networks") are being deployed throughout the world.

In 3G networks, Proportional Fair scheduling ("PF") is a process used by base stations (BSs) to schedule downlink traffic flows to users (e.g., mobile/wireless devices) in a somewhat even-handed or fair manner. One example of how the PF process works is as follows. Consider a situation where the condition of a channel used by each active user sharing the channel is independently variable. To report the condition it detects, each user continuously sends its measured channel condition back to a centralized PF scheduler which resides within a base station. Provided the time it takes to send these measurements is relatively small compared to the rate at which the condition of the channel is varying, the scheduler receives a good estimate of the channel conditions detected by each user; information it then uses to schedule the transmission of packets to each user. PF is said to exploit multi-user diversity by selecting the user associated with the best channel condition to transmit to during a given time period/slot. By "multi-user diversity" we mean, for example, in a large system with multiple users each with an independently fading channel, there is more than likely at least one user that is associated with a channel whose condition is acceptable. This approach may substantially increase a wireless system's throughput compared to a so-called round-robin scheduler. However, it may be unfair to a user that is associated with a channel whose condition is not very good because few data/packets may be transmitted to such a user. Realizing this, alternative PF techniques attempt to assign a "weight" (e.g., a value) to each user that is based on a historical, average data rate achieved by a user over a given channel instead of using a instantaneous (i.e., real-time or current) rate.

Even though the alternative PF scheduling techniques may achieve high throughput and maintain some kind of fairness among users associated with the same base station, the degree or level of fairness achieved is still not acceptable and, in the inventors' opinion, can be improved.

Hindering the ability to achieve better or increased fairness is the fact that users and their devices (the terms are used interchangeably herein) are initially associated with base stations without taking into account fairness considerations. Instead, a mobile device is most commonly associated with a base station from which it receives the strongest signal. Such a user-to-base station association technique may create load imbalances (e.g., some base stations are heavily loaded while other neighboring base stations are lightly loaded) which tend to decrease the overall throughput and fairness for each user associated with a given neighboring base station.

Accordingly, it is desirable to provide methods and devices for achieving proportional fairness by taking into account user-to-base station associations.

SUMMARY OF THE INVENTION

The inventors made a number of discoveries aimed at novel ways to associate users with base stations to ultimately achieve a more effective way of scheduling transmissions to such users while maintaining throughput and fairness. Initially, the inventors discovered and formulated a simplified model of a complex, generalized, NP-hard PF model ("GPF"). The discovery and formulation of such a simplified model was a non-trivial achievement in, and of, itself. In their simplified model, multi-user diversity only depends on the number of users scheduled together and all users are given equal priority. Further, the inventors discovered solutions/processes/methods (collectively referred to as "methods") based on the simplified GPF model that can be solved within an acceptable time period (a so-called "polynomial" time period) in order to realize a more effective way of scheduling data packet transmissions. It should be understood that by data packet is meant packetized data which may be related to text, audio, video or voice information.

For example, the inventors discovered so-called online methods based on the simplified model. By "online" is meant, for example, the use of a method or device that determines a user-to-base station association as a user arrives within the coverage area of a base station without having the benefit of future information (e.g. the future arrival of other mobile devices). These methods improve fairness without changing existing user-to-base station associations and are very close to an optimal, offline solution.

In one embodiment of the invention, an online method comprises a "greedy heuristic" process that achieves significantly better throughput and fairness than conventional approaches that assign users to base stations based only on signal strength.

In another embodiment, an inventive online method comprises first partitioning a wireless network into one or more smaller regions made up of base stations and mobile devices and then swapping or changing the association of some of the mobile devices/base stations to approach an optimal association goal, provided the number of swaps and changes does not exceed a threshold in order to keep the computational overhead within acceptable limits.

A DESCRIPTION OF THE INVENTION, WITH EXAMPLES

Figure 1:
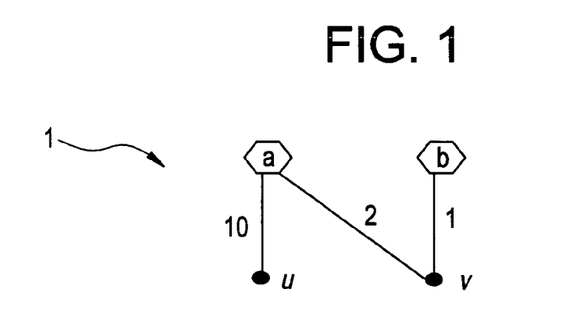
FIG. 1 depicts a wireless network illustrating features of embodiments of the present invention.

Referring now to FIG. 1, there is shown a wireless network 1 that contains BSs a and b along with users u and v. By way of example, we assume the average downlink data rates associated with these base stations and users is $r_{ua}=10$, $r_{ub}=0$, $r_{va}=2$, and $r_{vb}=1$, respectively. Using existing techniques, where user-to-base station associations are based on signal strength, both u and v would be associated with BS a. Further, if BS a is using a conventional PF scheduling technique, then u will be assigned a bandwidth of 5 units and v 1 unit. However, in accordance with one embodiment of the invention, if both user-to-base station associations and fairness are considered jointly, users u and v may be associated with BS a and b, respectively. This gives u a bandwidth of 10 and v a bandwidth of 1. As will be recognized by those skilled in the art, this represents is more effective allocation of bandwidth.

Figure 2:
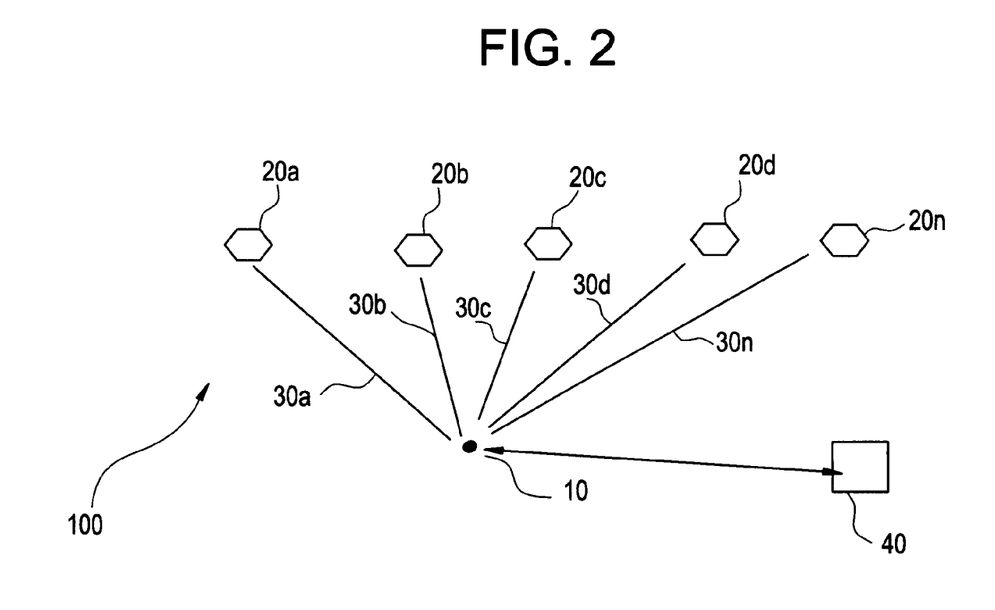
FIG. 2 depicts a wireless network illustrating features of embodiments of the present invention, including the use of a radio network controller ("RNC").

In the discussion that follows, we focus on the downlink scheduling of data (e.g., packetized data) from base stations to users in a 3G wireless network, it be understood that the same or a similar discussion may apply to other advanced wireless networks as well, such as WiFi or WiMax networks. Referring to FIG. 2, when a mobile device 10 within a 3G wireless network 100 powers up or becomes active, we assume that it reports a set of BSs 20a-20n (where "n" is the last reported base station) it can "hear" (i.e., communicate with) and the rate at which it currently can receive data packets over each channel 30a-30n from BSs 20a-20n (referred to herein as "data rate") to a radio network controller ("RNC"). The RNC 40 then selects a base station from among base stations 20a-20n that the user (i.e., device 10) may become associated with based on the reported data rates, preexisting information related to users that are currently associated with each BS 20a-20n and one of the inventive methods discussed herein. Alternatively, the network 100 may first associate the device 10 to base stations 20a-20n based on signal strength, instruct the device 10 to report the average data rates between it and the so-associated base stations 20a-20n, and then finally re-associate the device 10 to an optimal base station among stations 20-20n using one of the inventive methods discussed herein.

In either case, it is further assumed that each BS 20a-20n is preferably operable to complete independent, PF scheduling (i.e., includes hardware and software capable of completing PF scheduling) and the RNC 40 is preferably used to determine user-to-base station associations.

In accordance with the present invention, the inventors present novel methods and devices for determining user associations only during arrival or handoff events. In the discussion herein the inventive methods may be executed and implemented using hardware, software, firmware and the like that are a part of an RNC, though, one or more of the features/functions of the inventive methods may also be executed within a base station or mobile device.

During the development of their novel methods and devices the inventors also developed a detailed and rigorous formulation of a so-called network-wide, proportional fairness bandwidth allocation problem. For the sake of clarity, however, this detailed formulation has been omitted, it being understood that such details are not necessary to understand, appreciate and practice the present invention. Instead, we now present only a summary of this formulation.

The inventors first discovered the following formulation for a Generalized Proportional Fairness problem ("which is referred to hereafter as "GPF1") represented by equations (1) through (4) below as follows:

$$\max \sum_{a \in A} \sum_{u \in Q_a} \log(f_a(Q_a, u, R, \Omega)) \quad (1)$$

Subject to $$\sum_{a \in S_u} x_{ua=1}, \forall u \in U \quad (2)$$

$$Q_a\{u \mid x_{ua} = 1, \forall u \in U\} \quad (3)$$

$$x_{ua} = \{0, 1\} \quad (4)$$

In more detail, the inventors utilized a 3G wireless data network consisting of a set of BSs A, and a set of static users U. A user u's (within set U) average data rate when associated with a BS a (within A) is denoted as $r_{ua}$. Let $S_u=\{a \mid r_{ua}>0, \forall a \in A\}$, and the bandwidth allocation for users associated with a given BS be proportional fair. IF $x_{ua}$ denotes an association variable, then $x_{ua}=1$ if user u is associated with BS a, 0 otherwise. We assume a user can only be associated with one BS at any given time, i.e., only one BS can transmit data through its downlink to a user as in the EV-DO standard. Further, we only consider downlink bandwidth allocations.

In accordance with equation (2), all users must be admitted. Let the number of users associated with BS a be $y_a$, and the set of users associated with BS a be $Q_a$, i.e. $Q_a=\{u \mid x_{ua}=1, \forall u \in U\}$, in general multi-user diversity gain (the improvement in throughput due to the availability of at least one user out of many with an acceptable channel) depends on the set of users, not just the number of users.

Let R be the mapping that, given u and a, results in $r_{ua}$. Users may have different scheduling priorities for service differentiation. We denote the scheduling priority of user u as $\Omega_u$. If $x_{ua}=1$ for a given user u and BS a, its actual bandwidth allocation by BS a will be a general function of all the users associated with a. We denote this allocation function as $f_a(Q_a, u, R, \Omega_u)$. It should be noted that $f_a(Q_a, u, R, \Omega_u)=0$, if u is not in $Q_a$.

However, the GPF1 problem formulation turned out to be an unwieldy one to work with because it is a so-called NP-hard problem. It should be noted that though the inventors developed proofs demonstrating that GPF1 is indeed an NP-hard problem to solve, these proofs have also been omitted for the sake of clarity and brevity with the understanding that such details are not necessary to understand, appreciate and practice the present invention. Realizing this, the inventors further discovered that if the relative data rate fluctuations of devices in a wireless network are statistically identical, multi-user diversity gain only depends on the number of users associated with a given BS. This assumption is roughly valid when the users are, for example, communicating over Rayleigh fading type channels and the feasible data rate of the channel is approximately linear when the signal-to-noise ratio ("SNR") of the channel is not too high. Combining this assumption with the further assumption that all users are given the same priority the inventors discovered a simplified version of the GPF1 problem, referred to by the inventors as "GPF2", that can be represented by equations (5) through (8) as follows:

$$\max \sum_{u \in U} \sum_{a \in S_u} x_{ua} \log(r_{ua} G(y_a)/y_a) \quad (5)$$

Subject to

-continued $$\sum_{a \in S_u} x_{ua} = 1, \forall u \in U \quad (6)$$

$$y_a = \sum_{u: a \in S_u} x_{ua}, \forall a \in A \quad (7)$$

$$x_{ua} = \{0, 1\} \quad (8)$$

Equation (5) represents a so-called "objective function" which sets forth those parameters that need to be satisfied in order to achieve a maximum amount of proportional fairness among all users, while equations (6) through (8) represent constraints on equation (5). In accordance with the present invention, the present inventors discovered that unlike GPF1, GPF2 is solvable within a reasonable time period.

Figure 3:
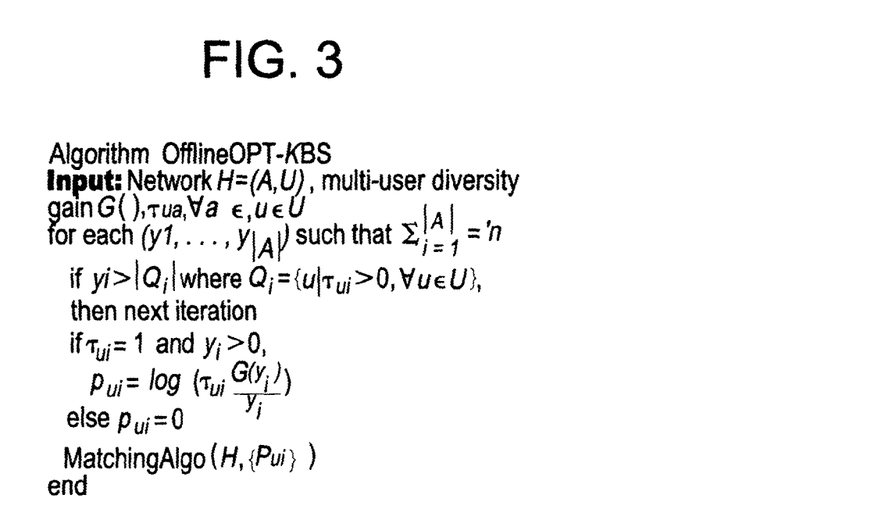
FIG. 3 depicts an offline, optimal method for generating user-to-base station associations in a wireless network according to embodiments of the present invention.

FIG. 3 depicts one example of an offline GPF2 method in accordance with an embodiment of the present invention. The embodiment shown in FIG. 3 is designed to be used offline to generate optimal user-to-base station associations. While developing GPF2 the inventors discovered that as long as $y_a$ the number of users associated with BS a is known and the number of BSs (denoted by "m") is constant, then GPF2 may be used to find optimal associations in a reasonable time period (sometimes referred to as a "polynomial" time period by those skilled in the art). For example, the total time period may be approximated as a function:

$$O(n^{m+3/2})$$

When the number of BSs is large, however, the offline method just discussed (sometimes referred to as "OfflineOPT") may be computationally inefficient (i.e., it takes up too much processing capacity). Realizing this, the inventors discovered a more efficient offline method by taking note of the spatial distribution of users; namely, that spatially distributed users inside a certain region will not be able to communicate with BSs farther away from the region, leading to a natural partition. Accordingly, in a further embodiment of the invention a network may be partitioned into one or more smaller regions that are connected together, where the number of possible connections (sometimes referred to as "edges") between regions is small. More specifically, the method involves using a GPF2 like method for each region, and then changing the associations of those users from one region, that are presently associated with a base station from another region, so that they are now associated with a base station within their own region using a so-called "greedy heuristic" process. Thereafter, transmissions may be subsequently scheduled.

Figure 4:
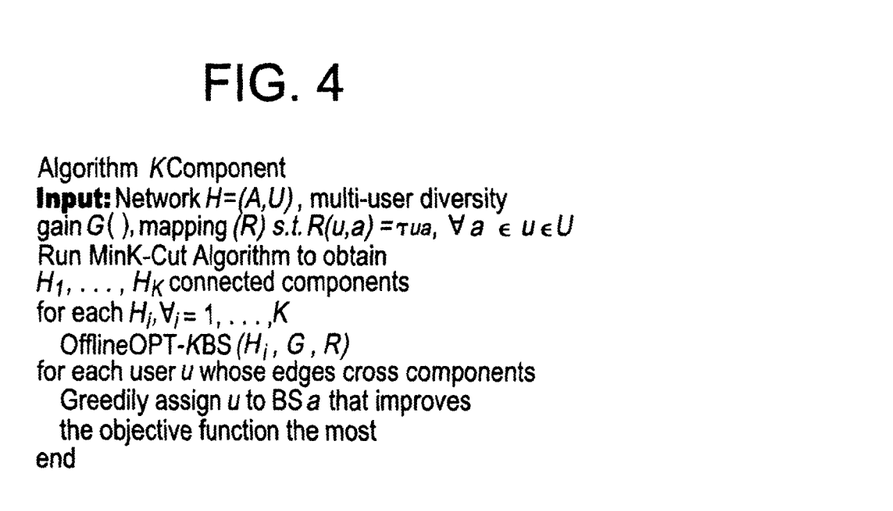
FIG. 4 depicts a method of associating users to base stations according to one embodiment of the present invention.

An example/description of this embodiment is shown in FIG. 4 and is referred to by the inventors as "K Component". A known approximation method may be used to compute a so-called "minimal weight, K cut" which may be defined as a set of edges whose removal leaves K connected regions. Further, in accordance with a further embodiment of the invention the number of regions K can be varied or tuned to balance optimal associations ("optimality" for short) with computational overhead.

Even though the efficiency of the offlineOPT method can be increased using the K Component method just described, in a large network with many users, offline methods may require a lot of computational overhead.

To overcome this shortcoming, the inventors discovered an alternative, offline heuristic method based on efficient local searching. This method allows the number of regions K to be tuned (i.e., adjusted) so that optimality and computational overhead can be properly balanced (e.g., the more optimal the associations, the more overhead required; the less optimal, the less overhead required). The inventors refer to this method as "local search" or "LS" for short.

In accordance with an embodiment of the present invention, the LS method includes functions the inventors refer to as "Swap" and "Change". In accordance with the present invention, if swapping the user-to-base station associations of two users (and related base stations) within the same region may improve an objective function (e.g. Eq. 5), then a Swap operation is performed. Similarly, if changing a single user-to-base station association from a base station in one region ("first" region) to a base station in another ("second" region) may help, then a Change operation is performed.

Figure 5A:
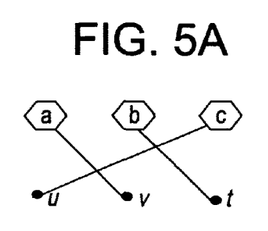
FIG. 5(a) depicts an optimal user-to-base station association technique.
Figure 5B:
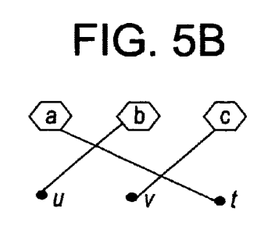
FIG. 5(b) depicts a user-to-base station association method according to one embodiment of the present invention.

In more detail, the Swap function may be initiated when a new user arrives within the coverage area of a base station. When this occurs, the Swap function associates a device, currently associated with a first base station in a first region (the term "first" is used for the sake of clarity), to a second base station in the same region while at the same time associating a device, currently associated with the second base station, with the first base station. To make sure that the Swap and Change processes are completed within a polynomial time period, in a further embodiment of the invention a lower bound constant $\delta$ is used such that each improvement operation, or L improvement operations, improves the objective function by at least OPT/$\delta$. Thus, the process may be guaranteed to terminate in time log OPT/$\delta$ iterations, with a running time of $O(\log (OPT/\delta)n^2)$. It should be noted that LS may get "stuck" at a local optima so that a global optima may not be achieved (e.g., an optimum user-to-base station association may not be found, etc.). The inventors compared user-to-base station associations generated using the LS method with those of an optimal process. The comparison showed favorable results. For example, given three BSs a, b, c, three users u, v, t and the following data rate values, $r_{ua}=123$, $r_{ub}=492$, $r_{uc}=893$, $r_{va}=425$, $r_{vb}=217$, $r_{vc}=659$, $r_{ta}=526$, $r_{tb}=756$, $r_{tc}=367$ it may be shown that optimal associations (see FIG. 5a) may yield an objective function value of 19.5 while the LS process (see FIG. 5b) yields a value of 19.0.

Further, the inventors discovered that a single Swap or Change operation will not yield a better association; instead at least two must be completed to see an improvement. Yet further, the inventors discovered that this phenomena can be replicated so that the LS process will fail even if Swap operations with |U|−1 users are carried out.

While the offline methods discussed above may be useful in computing optimal associations which can then be used for comparison purposes, they may be difficult to use in a dynamic network environment that includes mobile users. Recognizing this, the inventors developed two "greedy heuristic online" methods that require little computational overhead.

Initially, the inventors note that the online methods may also make use of the partitioning, swapping and changing steps mentioned above. For the sake of brevity, a description of these steps will not be repeated here. Instead, the following discussion will set forth the additional steps which may be used in their online methods to assure that the computational overhead capacity of a device is not exceeded.

In accordance with yet another embodiment of the invention, once a user becomes associated with a BS a first online method does not allow further user-to-base station association changes unless they are needed to complete a handoff or in response to a connection failure. Each association is also completed such that an objective function improves the most (e.g. equation 5). The inventors refer to this process as the "Greedy-0" process.

In a dynamic network environment, a particular user-to-base station association may need to be changed, and is changed, frequently. Because of this, the inventors developed a second greedy heuristic online method that places a limit (or uses a threshold) on the number of user-to-base station association changes that can be made. Said another way, this second online method limits the number of user-to-base station association changes that can be made per base station to k existing users, where k can be set by network operators and the like. Because k is typically a small number, the second method may include the additional steps of trying many possible values of k and picking the one that improves the objective function the most. This process is referred to as the "Greedy-K" process, where the K indicates the number of user-to base station changes that may be made in order to accommodate newly arrived users.

In addition to developing proofs of the processes described above, the inventors also carried out simulations/experiments to evaluate their processes against known ones. The simulations included: (a) evaluating the quality of the LS process by comparing it to an optimal algorithm for a small problem size; (b) investigating the advantages of associations based on the GPF2 problem formulation and related method over known Best-Signal (i.e., strongest signal strength) and Max-Min association processes; (c) evaluating the performance of the two online methods, Greedy-0 and Greedy-K.

Many of the details of the experimental set-ups used to carry out the simulations have been omitted from the present discussion in order to simplify the discussion, it being understood that such details are not necessary to understand, appreciate and practice the present invention. That said, the following information about the simulations may prove useful to the reader.

Figure 6:
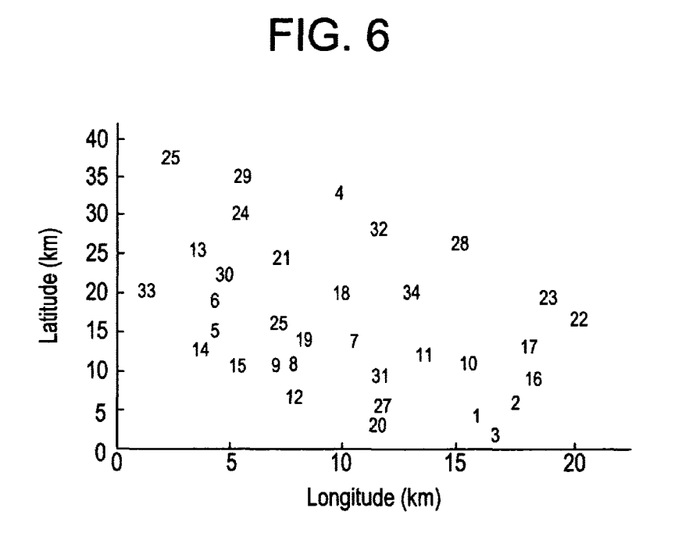
FIG. 6 depicts a map of base station layouts that the inventors used to carry out simulations related to the present invention.

A map of base station layouts that the inventors used for the simulations/evaluations is depicted in FIG. 6. It is part of a 3G network operated by a major service provider in United States. This layout includes 34 base stations within an area 50×30 km². In the inventors' simulations it was assumed that all of the base stations had a uniform radius of 5 km and that there were a total of 1000 3G HDR mobiles in the network. Further, it was assumed that user requests for radio channels arrive according to a Poisson process with an average rate 0.001/second; and that the average radio channel holding time is exponentially distributed with a mean of 300 seconds. The inventors divided the map in FIG. 6 into 50×30 zones where each zone represented one square kilometer. Yet further, it was assumed that mobile devices migrated from one zone to another with a mean exponentially distributed staying time of 60 seconds, that mobile devices within the same zone had the same rates and that a change in association may be performed when an active mobile moves from one zone to another as its' rate changes.

In order to simulate skewed user distributions that are typical in a real 3G network, the inventors assigned randomly generated weights to different zones. When a mobile moved, it choose its next destination zone from one of the neighboring zones with a probability proportional to the weights of that zone.

In a first set of simulations comparing the LS method to an optimal process, the inventors observed that nearly 90% of the time the LS heuristic method achieved the same objective function values as the optimal process. Thus, the inventors believe that it is feasible to approximate optimal associations using their LS heuristic-based methods.

Next, the GPF methods described above were compared to conventional association processes, including the Best-Signal and Max-Min processes. The comparisons involved using achieved network aggregate throughput and fairness metrics. The throughput metric measures the throughput efficiency at the network level whereas the fairness metric focuses on the performance perceived by each individual user.

Figure 7:
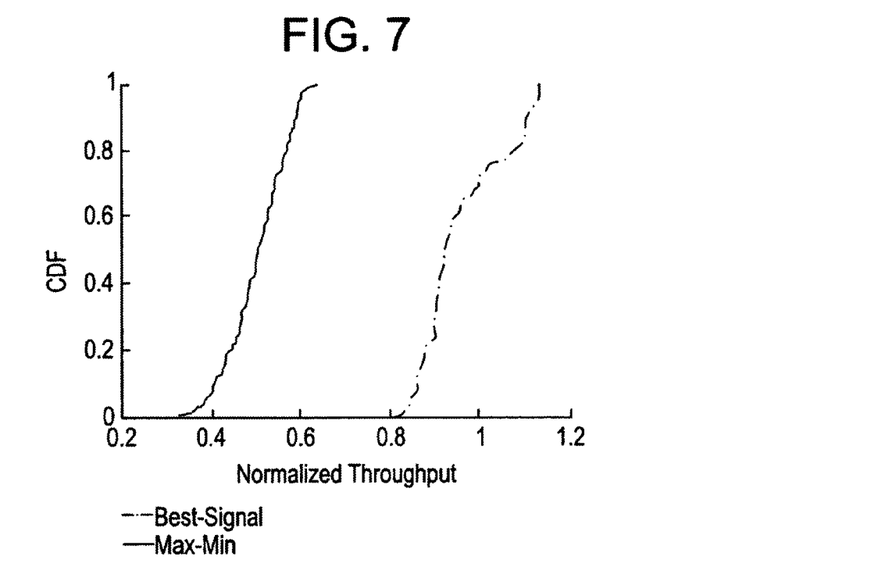
FIGS. 7 and 8 depict comparisons of conventional user-to-base station association processes with methods of the present invention.

The inventors observed (see FIG. 7) that both the Best-Signal process and GPF methods achieved much higher throughput than the Max-Min process. In almost every case, the Max-Min process achieves a throughput which is less than 60% of the throughput of the GPF methods.

Figure 8:
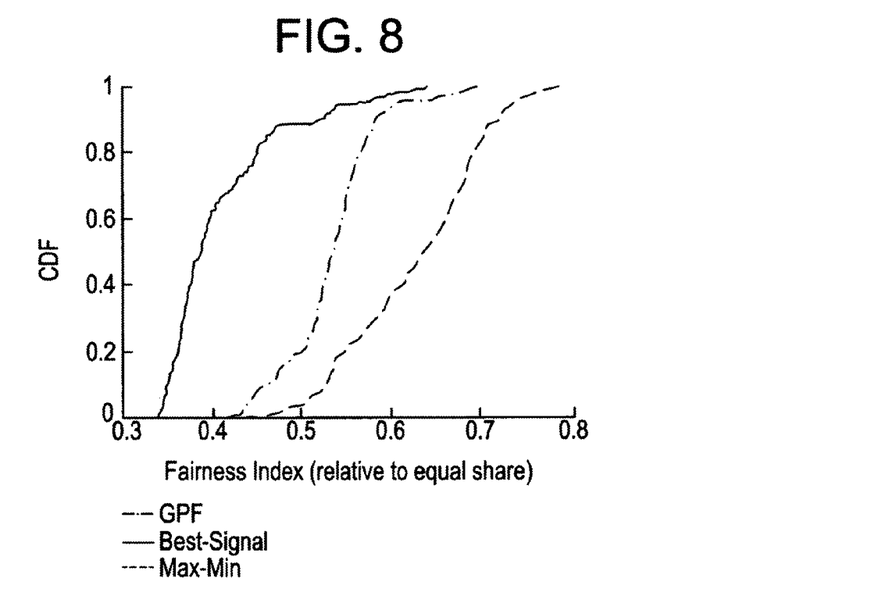

Compared against the Best-Signal process, the GPF methods achieve higher throughputs more than 80% of the time. Further, the GPF methods achieve throughputs that exceed that of the Best-Signal process by 10%, nearly 60% of the time. FIG. 8 illustrates the fact that bandwidth allocations generated by an inventive GPF method are fairer than those generated by the Best-Signal process. Though the allocations generated by the Max-Min process appears to be the "fairest", from FIG. 7 it is evident that this fairness comes at a price; by significantly compromising throughput (i.e., lower throughputs).

In sum, the GPF association methods described herein achieve significantly better throughput and fairness when compared to existing approaches.

Finally, the inventors carried out simulations using the two online methods (Greedy-0 and Greedy-K). The inventors observed that more than 70% of the time the online methods achieved throughputs greater than 95% of that achieved by the offline GPF process, thus demonstrating that the online processes provide results that are close to the offline optimal solution.

Figure 9:
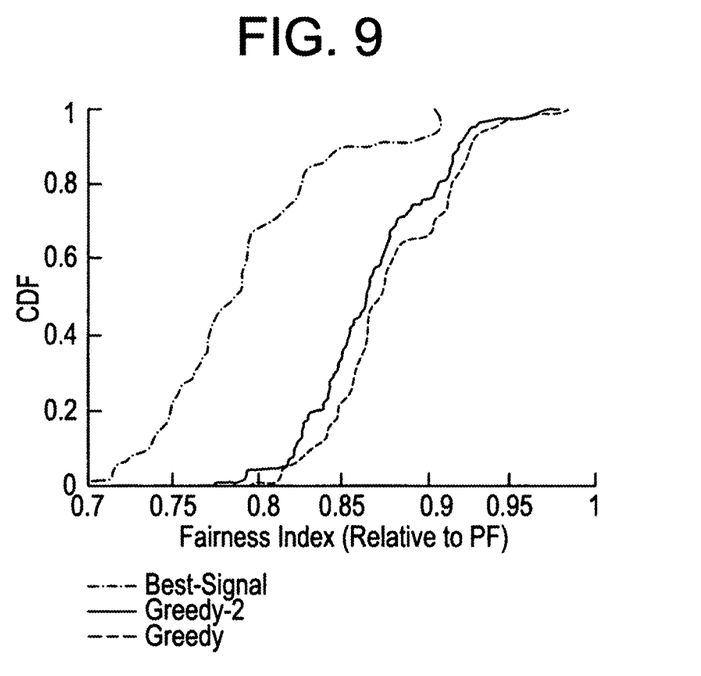
FIG. 9 depicts the cumulative distribution function ("CDF") for the fairness indexes of different association processes/methods.

FIG. 9 presents the CDF of fairness indexes for different association processes/methods. From this figure, one skilled in the art can see that both online methods are fairer than a Best-Signal process, with the Greedy-2 (i.e., K=2) process slightly more fairer than the Greedy-0 process. The fairness indexes for both online methods are almost always greater than 0.8.

The discussion above has set forth some examples of the ideas underlying the present invention. It should be understood that various changes may be to the exemplary methods discussed above; yet these changes (and their associated devices) may still fall within the scope of the present invention.

We claim:

1. A method for generating user-to-base station associations in a wireless network comprising:
   partitioning a wireless network into one or more regions, each region including wireless devices and base stations;
   generating user-to-base station associations when a user arrives within the coverage area of a base station by,
      swapping user-to-base station associations of two or more devices of the wireless devices by associating a first device, currently associated with a first base station in a first region, to a second base station in the same region and associating a second device, currently associated with the second base station, to the first base station; and
      changing the user-to-base station associations by associating the first device, currently associated with the first base station in the first region, to the second base station in a second region,
   wherein each swapping and changing step is completed within a polynomial time period.

2. The method as in claim 1 wherein the network is a 3G wireless network.

3. The method as in claim 1 wherein the network is a WiFi wireless network.

4. The method as in claim 1 wherein the network is a WiMax wireless network.

5. The method as in claim 1 further comprising adjusting the number of regions that are created by partitioning to balance optimal associations and computational overhead.

6. The method as in claim 1 wherein the time period is approximately $O(n^{m+3/2})$ seconds.

7. The method as in claim 1 wherein the generation of the user-to-base station associations further comprises using a greedy heuristic process.

8. The method as in claim 1 further comprising scheduling the transmission of packets to the wireless devices in a proportionally fair manner.

9. The method as in claim 1 wherein the time period is $O(\log(OPT/\delta)n^2)$ seconds.

10. A device for generating user-to-base station associations in a wireless network, the device operable to:
    partition a wireless network into one or more regions, each region including wireless devices and base stations;
    generate user-to-base station associations when a user arrives within the coverage area of a base station by,
    swap user-to-base station associations of two or more devices of the wireless devices by associating a first device, currently associated with a first base station in a first region, to a second base station in the same region and associating a second device, currently associated with the second base station, to the first base station; and
    change the user-to-base station associations by associating the first device, currently associated with the first base station in the first region, to the second base station in a second region,
    wherein each swap and change is completed within a polynomial time period.

11. The device as in claim 10 wherein the network is a 3G wireless network.

12. The method as in claim 10 wherein the network is a WiFi wireless network.

13. The device as in claim 10 wherein the network is a WiMax wireless network.

14. The device as in claim 10 further operable to adjust the number of regions that are created by partitioning to balance optimal associations and computational overhead.

15. The device as in claim 10 wherein the time period is approximately $O(n^{m+3/2})$ seconds.

16. The device as in claim 10 further operable to generate the user-to-base station associations using a greedy heuristic process.

17. The device as in claim 10 wherein the time period is $O(\log(OPT/\delta)n^2)$ seconds.

18. The device as in claim 10 wherein the device comprises a radio network controller.

* * * * *